March 22, 1927.
W. J. MILLER
TRUCK
Filed March 10, 1926
1,621,555
2 Sheets-Sheet 1
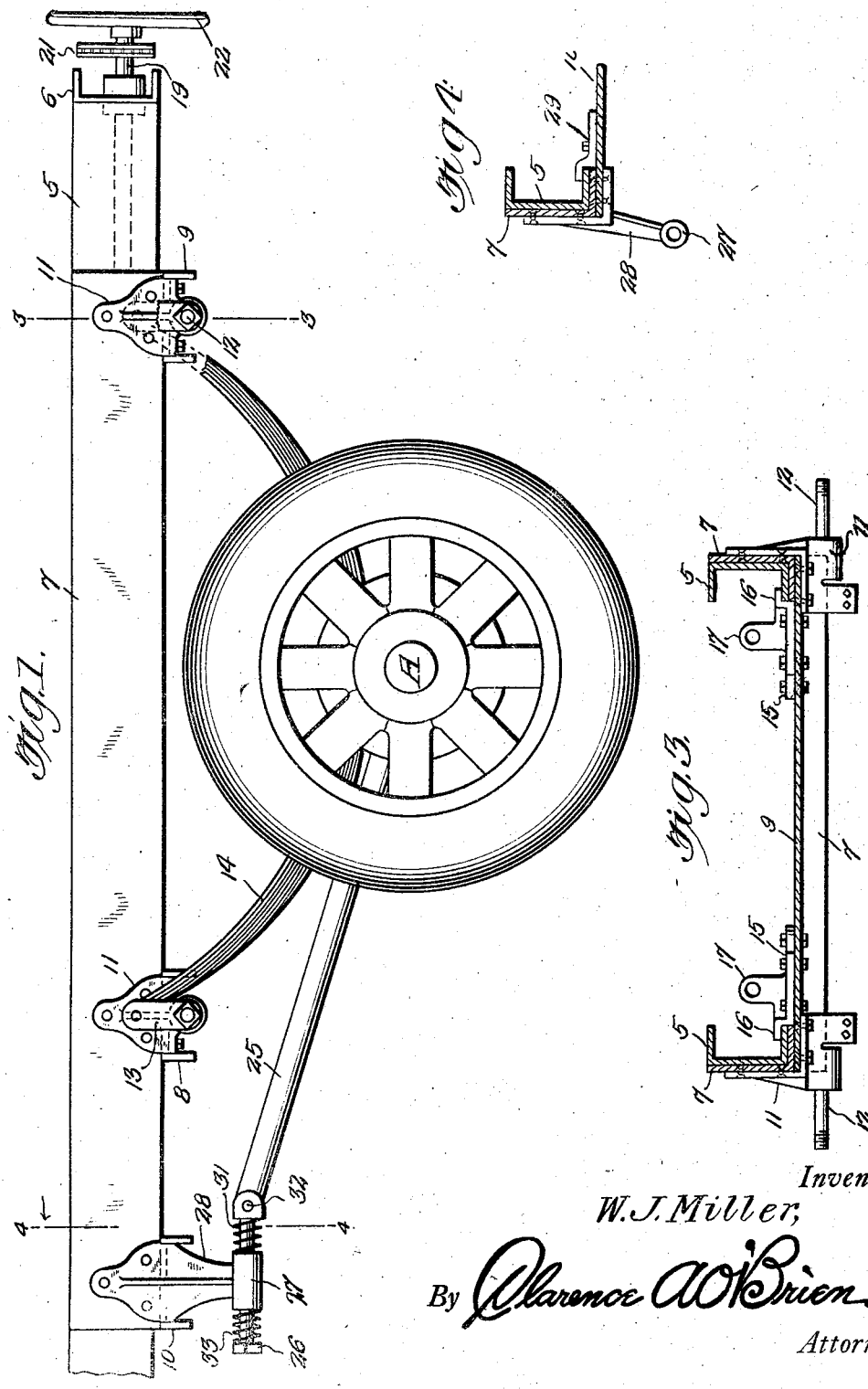
Inventor
W. J. Miller,
By Clarence A. O'Brien
Attorney March 22, 1927. 1,621,555
W. J. MILLER
TRUCK
Filed March 10, 1926 2 Sheets-Sheet 2
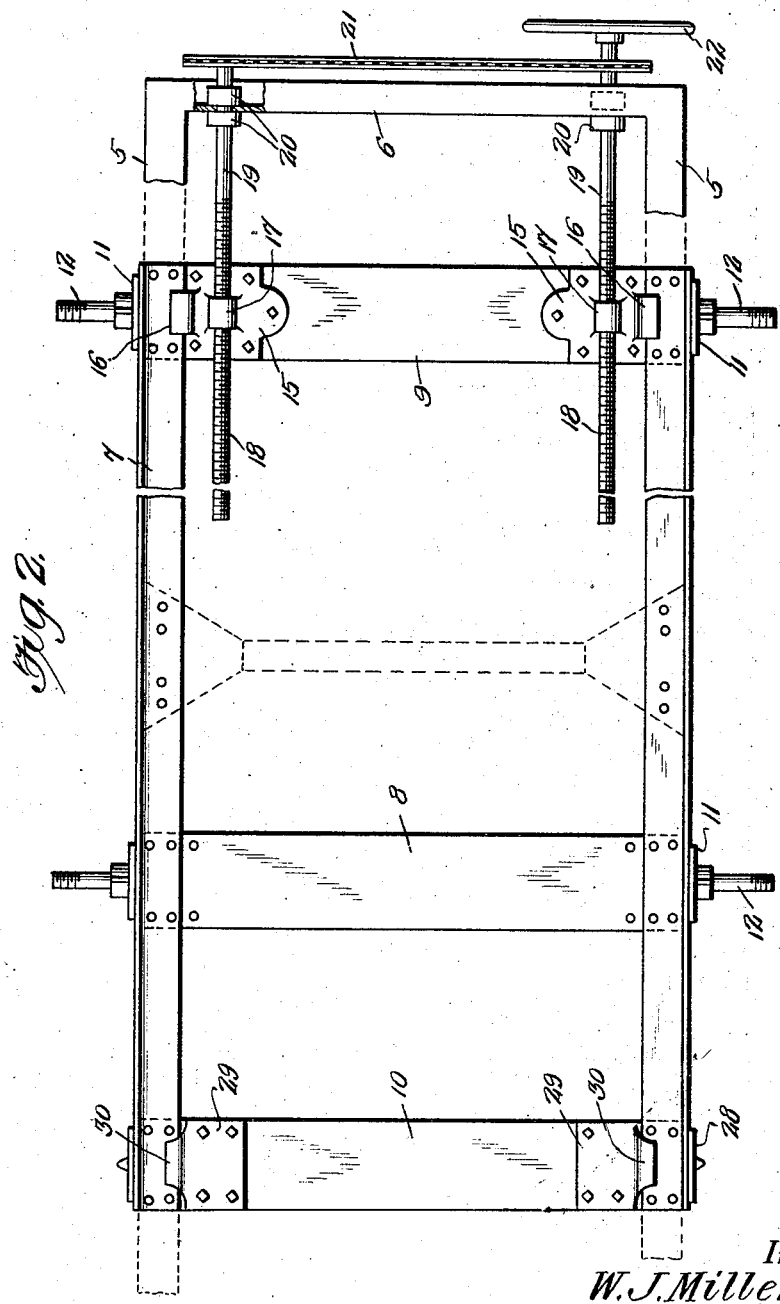
Inventor
W. J. Miller,
By Clarence A. O'Brien
Attorney Patented Mar. 22, 1927.

1,621,555

UNITED STATES PATENT OFFICE.

WILLIAM J. MILLER, OF SAGINAW, MICHIGAN.

TRUCK.

Application filed March 10, 1926. Serial No. 93,683.

The present invention relates to improvements in automobile trucks and has for its principal object to provide a mounting for the rear axle so that it may be disposed below different points of the truck chassis for the purpose of more evenly distributing the load between the front and rear wheels.

The invention is particularly useful in connection with trucks in hauling lumber, thus when exceptionally long pieces are being hauled, the rear axle may be shifted rearwardly of the chassis so that the proper proportion of the weight will be on the front wheels of the truck.

Obviously, the invention has other usages than that mentioned in the example.

A very important object of the invention is to provide an improvement of this nature which is exceedingly simple in its construction, easy to adjust, comparatively inexpensive to manufacture, strong, durable, efficient and reliable in use, not likely to easily become out of order, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a fragmentary side elevation of a truck showing particularly the rear end thereof with my improvement incorporated therewith, Fig. 2 is a top plan view thereof, and Figs. 3 and 4 are detail transverse sections taken substantially on the line 3—3 and 4—4 respectively, Fig. 1.

Referring to the drawing in detail, it will be seen that numerals 5 denote the side rails of the body chassis connected at the rear end by the cross member 6 in the usual well known manner. The rails 5 and the member 6 are formed as is customary of channel iron. My auxiliary chassis includes a pair of side rails 7 constructed of angle iron. The side rails 7 are mounted to slide under and to the outside of the rails 5 as is clearly seen in Fig. 3. The rails 7 are connected by transverse members 8, 9 and 10. Shackle bolt brackets 11 are mounted on the ends of the transverse members 8 and 9 and to the outside of the rails 7 for securing the rails to the transverse members. Shackle bolts 12 project outwardly from the brackets 11 for receiving shackles 13 which extend upwardly therefrom, and have engaged with their upper ends the semi-elliptical springs 14 on which is mounted the rear axle construction indicated generally by the letter A.

Brackets 15 are mounted on the upper surface of the transverse member 9 one at each end thereof, and are provided with overhanging extension 16 for engaging the bottoms of the side rails 5, thus supporting the main chassis on the auxiliary chassis, so that said auxiliary chassis may be slid longitudinally thereof. Nuts 17 rise from the brackets 15 for receiving the screw threaded portions 18 of shafts 19 which are journaled through the cross member 6 and have collars 20 thereon for preventing movement of the shaft longitudinally through the cross member 6. These shafts 19 are provided with sprockets at their rear ends over which a chain 21 is trained. One of the shafts is provided with a hand wheel 22. By the turning of this hand wheel both shafts 19 may be operated in unison as is quite apparent. Thus by the operation of the hand wheel and the operation of the shaft 9, the auxiliary chassis may be moved longitudinally of the main chassis for spacing the rear axle assembly A a distance from the rear end of the truck, depending upon the nature of the load on the truck. Any suitable extensible drive shaft may be used with the auxiliary housing A.

The brakes of the wheels of the auxiliary rear axle assembly may be operated in the well known hydraulic manner now in common use or if desired the brakes could be provided on the drive shaft. Radius rods 25 extend upwardly and forwardly from the rear axle assembly, and have pivotally connected to their upper ends bolts 26 which project through sleeves 27 on the lower ends of brackets 28 which are attached to the side rails 7 and the transverse member 10 as is clearly shown in Fig. 4. There is also provided on the cross member 10 a pair of brackets 29 having extensions 30 overhanging the bottom portions of the rails 5 as is also clearly shown in Fig. 4.

Spring 31 is disposed between the sleeve 27 and the pivotal joint 32 about the bolt 26. A similar spring 33 is disposed about the bolt between the headed end thereof and the sleeve 27.

It is thought that the construction, utility, operation, and advantages of this invention will now be clearly understood without a more detailed description. The present embodiment of the invention has been disclosed in detail merely by way of example, since in actual practice it attains the features of advantage enumerated as desirable in the statement of the invention and the above description.

It will be apparent, however, that numerous changes in the details of construction, and in the combination and arrangement of parts may be resorted to without departing from the spirit or scope of the invention as hereinafter claimed, or sacrificing any of its advantages.

Having thus described my invention, what I claim as new is:—

A truck of the class described including a main chassis comprising a pair of side rails formed of channel members, an auxiliary chassis comprising a pair of side rails formed of L-shaped members and cross members connecting the ends of the L-shaped members, plates on the cross members having hooked-shaped extensions rising upwardly therefrom and extending outwardly toward the sides of the auxiliary chassis for engaging over the bottoms of the channel side rails of the main chassis for slidably mounting the auxiliary chassis on the main chassis, means for mounting a rear axle and wheel assembly on the auxiliary frame, and means for moving the auxiliary frame longitudinally of the main chassis.

In testimony whereof I affix my signature.

WILLIAM J. MILLER.